Sept. 22, 1964  P. L. BERTRAND ETAL  3,149,945
DIFFERENTIAL THERMAL TREATMENT OF GLASS OBJECTS
Filed Oct. 21, 1955  2 Sheets-Sheet 2

INVENTORS
PIERRE BERTRAND &
PAUL HENRI ACLOQUE

BY *Albert L. Frey.*
ATTORNEY

United States Patent Office 3,149,945
Patented Sept. 22, 1964

3,149,945
DIFFERENTIAL THERMAL TREATMENT OF
GLASS OBJECTS
Pierre L. Bertrand and Paul Henri Acloque, Paris, France, assignors to Compagnie de Saint-Gobain, a corporation of France
Filed Oct. 21, 1955, Ser. No. 542,108
Claims priority, application France Dec. 30, 1954
10 Claims. (Cl. 65—23)

This invention relates to a process for heat treating glass products. In particular it enables subjecting one or several areas of a glass object to thermal conditions different from those of other areas of this product and to control this differentiation by simple means.

The process according to the invention consists in covering or coating certain areas of the surface of the object with a substance in contact with this surface and capable of influencing the conditions of the heat exchanges between this object and the outside, then heat treating the object thus covered, and finally removing the coating from the product. This substance may be a coat of paint deposited on the glass product, or else a sheet, film or the like, made to adhere to the glass by any appropriate means, particularly by sticking.

Reference may be had to the accompanying drawings in which the heating and chilling steps are portrayed.

Figure 2:
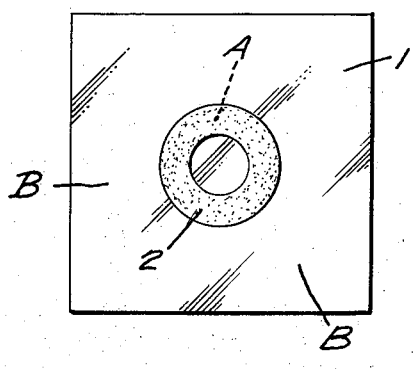
FIG. 2 is a side view of a glass sheet with a coating applied to the glass surface.
Figure 3:
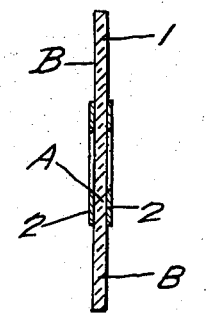
FIG. 3 is a vertical section through FIG. 2.
Figure 4:
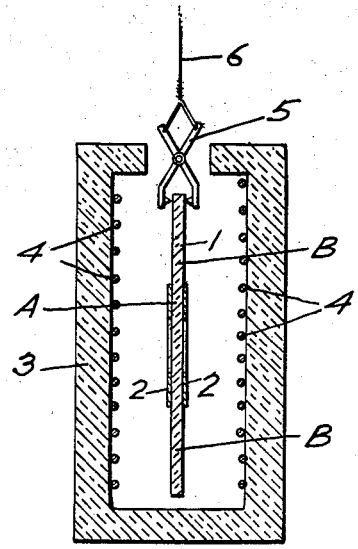
FIG. 4 is a diagrammatic vertical section through an electrical heating furnace showing the glass sheet with its coating in position for the heating operation.

In FIGS. 2 and 3 there is shown a glass sheet or plate 1 having an annular selected zone or area A surrounded by the zone or area B. The selected zone A is here shown as covered with an annular coating 2 approximating the size and shape of the zone A and is in direct and intimate contact with opposite sides of the sheet at the selected zone.

The coatings having been applied to the sheet as herein explained, the glass sheet is delivered to the interior of an electric heating furnace 3, provided with the resistors 4. The glass sheet 1 may be suspended within the furnace by tongs 5 and cables 6.

Figure 5:
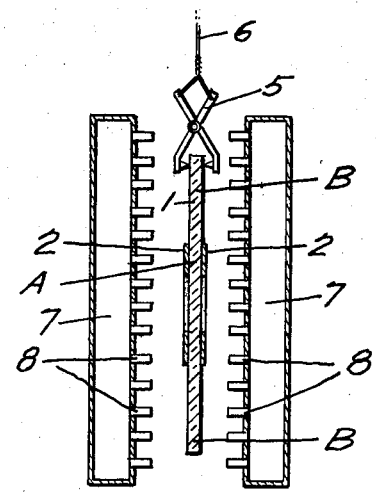
FIG. 5 is a diagrammatic vertical section through oppositely placed blow boxes showing the glass sheet with its coating in position for the rapid chilling of the sheet.

When the glass sheet has been heated to approximately softening point it is removed from the furnace and promptly delivered to a position between oppositely positioned hollow blow boxes 7 provided with a series of nozzles or openings 8 spaced from the glass sheet as shown in FIG. 5. A chilling medium for example air under pressure enters the blow boxes 7 from a suitable source (not shown) and is projected from the nozzles or openings 8 upon the opposite surfaces of the glass sheet to rapidly chill the same.

In the process according to the invention the covering substance not only intercepts, more or less, according to its opacity, the radiation of heat introduced in the heat treatment, but also, being in contact with the glass, it takes the place of the glass with regards to the heat exchanges between the covered area of the glass surface and the outside.

Through the choice of coating substance having an absorbing or transmitting capacity different from that of the glass, it is possible, under these conditions, to modify the transmission of heat by radiation towards or away from the product involved in the heat treatment. At the same time, the transmission of heat, by convection or conduction on the surface of the product, can be varied according to the chosen coating substance, in particular according to the grain size, the color, the heat conductivity of the substance, etc.

Of course, the object to be treated, can be given several partial coatings of the same or different nature, depending upon the results to be obtained.

In particular, the application of the process according to the invention is of great simplicity and flexibility in the case where the differentiated heat treatment is a tempering process consisting of, as is known, two consecutive phases of very dissimilar character—heating to near softening, rapid chilling—which must succeed one another rapidly.

One of the advantages of this invention is that the instrumentation and manipulation for differential tempering, is reduced to a minimum, because it only requires, prior to the heating operation, the coating of the parts to be differentiated, then the coating is left in place during the entire heat treatment and removed only after the cooling phase.

On the other hand, in the procedure according to the invention, the transmission of heat by radiation or convection, or conduction, to the surface of the coated areas can be regulated with any desired degree of accuracy for the thermal result to be obtained in each one of the two phases of tempering. This is obtained by proper choice of covering substance in terms of its reflecting power, its opacity, grain size, conductivity, etc., factors, each of which plays as indicated above a part according to its own law in the different modes of heat transmission.

In this respect, the investigations of the applicant have shown that a coating which is both conductive and reflective can be used to advantage for the differentiated tempering of glass objects.

The thus chosen substance facilitates the transfer, by conduction to the object, of the fraction of heat which it absorbs or radiates, said fraction may itself be fixed accurately by choosing the reflecting power of the coating substance.

It was found possible to establish, experimentally, the relationship between the reflecting power of a coating and the stress which is set up, in the area of the coated product, by the particular heat treatment.

For this purpose, one can measure the reflecting power of the particular coating substance by means of a photometer, in the infrared, and then measure by means of conventional birefringence instruments, the stress eventually existing in the coated area of the product after being heated in a furnace, say, at 700° C. and rapidly cooled by air blast upon removal of the glass plate or sheet from the furnace.

Figure 1:
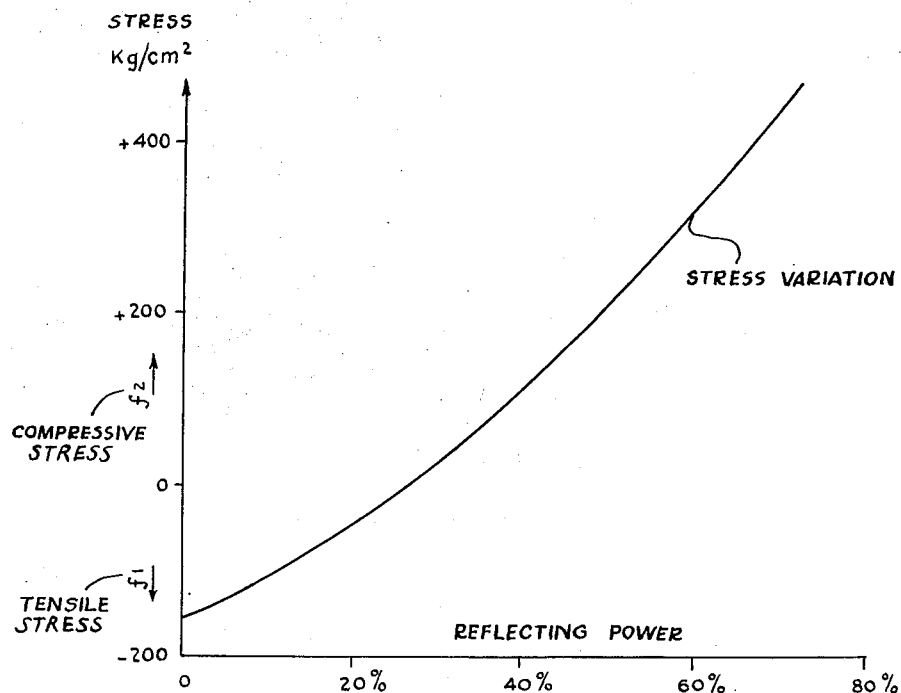
FIG. 1 is a curve representing in the coated area at the selected zone of the glass sheet the stress variation due to the heat treatment in terms of the reflecting power of the coating substance.

In the accompanying drawing, FIG. 1, the curve represents in the coated area of the glass the stress variation due to such a heat treatment in terms of the reflecting power of the coating substance. The reflecting power is shown as abscissa (percent) and the stress as ordinate (kg./cm.²). The arrows $f1$ and $f2$ indicate the directions of the tensile and compressive stress, respectively. After such an experimental curve has been obtained, it is possible to select the coating which corresponds to the desired stress, and particularly, to a stress which does not exceed the limit of resistance of the glass.

As a general rule, a coating substance with the reflecting power corresponding to the stress involved, can be prepared by mixing reflecting and absorbing substances in proper proportions.

For example aluminum paint may be mixed in various proportions with carbon black. A few percent of carbon black under an incidence of 45° reduces the reflecting power of aluminum paint by half, a 12% reduces it by about ¾.

Another means of regulating the transmitting or absorbing power of a coating substance as well as the other properties of the coating to a suitable value consists in depositing the substance on the glass in such a manner that in the coated area the coating is discontinuous, certain areas of the glass in form of lines or points remaining uncovered.

A means of obtaining such discontinuous coatings consists, for example, in depositing the coating in a continuous manner and then drawing lines with some tool capable of briging out the bare glass at some predetermined spots.

Another means, in the case of spraying by gun, for example, consists in operating this spraying after having covered the area to be treated with a stencil in form of a sieve or perforated sheet, etc. This produces a punctuate coating.

When such a discontinuous coating has been obtained, its transmitting or reflecting power can be ascertained by means of the aforementioned photometer method, provided that the zone observed by the instrument includes a large number of covered and bare areas. The instrument gives then automatically an average of the reflecting power of the glass itself and of the deposited substance, which expresses the "porosity" of the obtained coating.

It should be noted that the discontinuous coatings play an extenuating role in comparison with the continuous coating, not only as regards to the exchange of heat by radiation, but also as regards to the exchange of heat by convection or conduction.

A large number of materials may enter the composition of the coating, especially as mixture carbon black, talc, kieselguhr, flakes of mica, metal in powder or granular form etc. They can be applied in form of paint, by brush or spray gun. Stencils are practicable also; and use can be made of the so-called "silk-screen" process. The substances employed must be such as not to attack the glass at the treatment temperature and be easily removable after the operation.

The decalcomania process is also practicable.

An example of the application of the process according to the invention for the manufacture of sheets of glass of differential tempering is given in the following.

A glass plate 40 x 40 x 0.6 centimeter is coated by a brush along a centered annular area of 185 and 120 mm. diameter on both sides of the glass with a paint consisting of a stirred mixture of 5% carbon black and 95% aluminum paint having the following composition.

| | Percent |
|---|---|
| Aluminum powder | 20 |
| Coumarone resins | 30 |
| White spirit | 50 |

When the paint is dry, the glass is placed in the resistor furnace usually employed for tempering, raised to an average temperature of 715° C., where it remains for 2 minutes 40 seconds. Then it is taken out and blown as usual for a tempering operation.

The paint is removed in a lukewarm caustic soda bath or by washing with hydrochloric acid.

In this case the annular area presents a stressed state comprising a circumferential compression of the order of 750 kg./cm.² If one of the adjacent tempered areas breaks (islet inside the ring or area around the ring), the crack stops at the ring and does not enter the other area.

What we claim is:

1. A process for submitting a glass article, in particular, a glass sheet to a tempering operation in which a selected part of the glass article is to be of less temper than other portions of the glass article, which consists in coating said selected part of the glass article with a substance adhering to the glass surface and having heat-reflective properties capable of controlling the conditions of the heat exchange between said article and the thermal source, heating said article thus coated at such a rate as to bring the uncoated parts to a temperature suitable for tempering while said coated part is at a reduced temperature relative thereto, rapidly chilling said coated article and then removing said coating from the article.

2. A process according to claim 1 in which the coating is a discontinuous layer.

3. A process for tempering a glass article, in particular, a glass sheet in which at least a selected part of the glass article is to be of less temper than other parts of the glass article, which consists in applying to said selected part of the glass article a paint having heat-reflective properties capable of controlling the conditions of the heat exchange between said article and the thermal source, heating said article thus painted at such a rate as to bring the unpainted parts to a temperature suitable for tempering while the selected part is at a reduced temperature relative thereto, rapidly chilling said painted article and then removing the paint from the article.

4. A process according to claim 3 in which the paint is constituted by a mixture of heat refletcing and conducting substances.

5. A process according to claim 3 in which the paint consists essentially of powdered aluminum, carbon black and a vehicle.

6. A method for submitting a glass sheet to a differentiated tempering, in which a selected part of the sheet is to be less tempered than other parts, which consists in applying on both faces of said selected part a coating material having reflective properties capable of reducing the heat transmission between the heating source and the glass, in submitting the thus coated sheets to a heating operation over its whole surface at such a rate as to bring the uncoated portion to the temperature convenient for tempering while the coated part due to the action of the coating is less heated, and then chilling the sheet.

7. A method for submitting a glass sheet to a differentiated tempering in which a selected part of the sheet is to be less tempered than other parts, which consists in applying to said selected part a coating material having reflective properties, in submitting the thus coated sheet to a heating operation over its whole surface at such a rate as to bring the uncoated portion to the temperature convenient for tempering while the coated part due to the action of the coating is less heated, and then chilling the sheet.

8. A method for submitting a glass sheet to a differentiated tempering operation in which a selected part of the sheet is to be less tempered than other parts, which consists in applying to said selected part a coating material having reflective properties and capable of remaining effective during the heating phase of the tempering operation, in submitting the thus coated glass sheet to a heating action over its whole surface at such a rate as to bring the uncoated portion to the temperature convenient for tempering while the coated part, due to the action of the coating, is less heated, cooling rapidly the glass sheet in the presence of the coating, and then removing the coating.

9. A method for submitting a glass sheet to a differentiated tempering, which consists in applying to a selected part a coating material having reflective properties, in submitting the thus coated sheet to a heating operation over its whole surface to bring the uncoated portion to the temperature convenient for tempering while the coated part due to the action of the coating is less heated, and then chilling the sheet.

10. A method for submitting a glass sheet to a differentiated tempering operation, which consists in applying to a selected part a coating material having reflective properties and capable of remaining effective during the heating phase of the tempering operation, in submitting the thus coated glass sheet to a heating action over its whole surface to bring the uncoated portion to the temperature convenient for tempering while the coated part, due to the action of the coating, is less heated, cooling rapidly the glass sheet in the presence of the coating, and then removing the coating.

References Cited in the file of this patent

UNITED STATES PATENTS

| | | |
|---|---|---|
| 1,830,788 | Forman | Nov. 10, 1931 |
| 1,910,549 | Junker | May 23, 1933 |
| 2,009,748 | Sherwood | July 30, 1935 |
| 2,177,324 | Long | Oct. 24, 1939 |
| 2,244,715 | Long | June 10, 1941 |
| 2,262,545 | Do Hun Chan | Nov. 11, 1941 |
| 2,485,176 | Waterfall | Oct. 18, 1949 |
| 2,646,647 | Bamford et al. | July 28, 1953 |
| 2,674,067 | Reggiani | Apr. 6, 1954 |
| 2,677,918 | Bird et al. | May 11, 1954 |
| 2,769,722 | Converse | Nov. 6, 1956 |

FOREIGN PATENTS

| | | |
|---|---|---|
| 359,955 | Great Britain | Oct. 26, 1931 |
| 450,464 | Great Britain | July 17, 1936 |
| 458,195 | Canada | July 19, 1949 |
| 1,063,312 | France | Dec. 16, 1953 |
| 1,038,439 | France | May 6, 1953 |
| 704,312 | Great Britain | Feb. 17, 1954 |
| 726,626 | Great Britain | Mar. 23, 1955 |